Patented July 17, 1928.

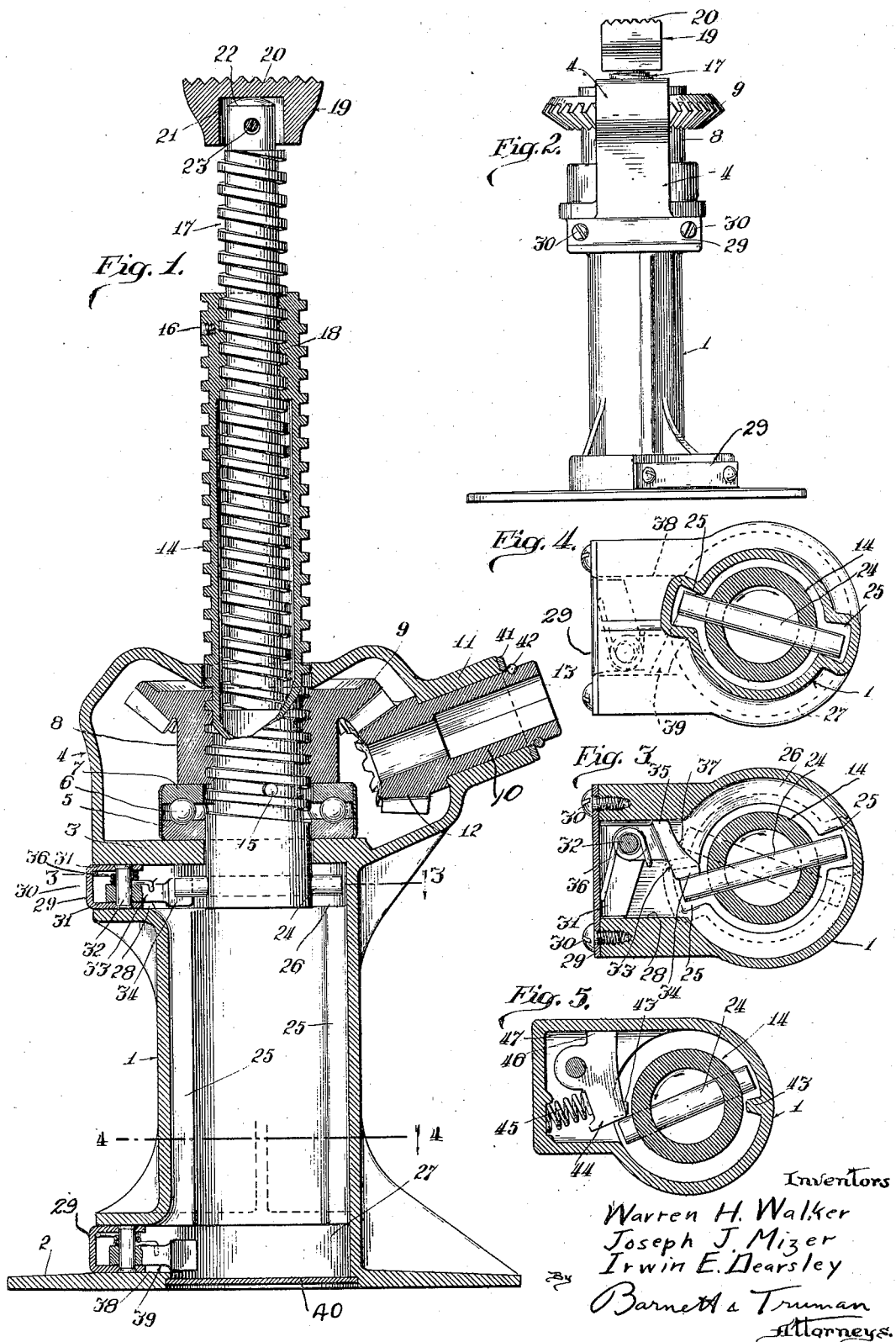

1,677,466

UNITED STATES PATENT OFFICE.

WARREN H. WALKER, JOSEPH J. MIZER, AND IRWIN E. DEARSLEY, OF RACINE, WISCONSIN, ASSIGNORS TO WALKER MANUFACTURING COMPANY, OF RACINE, WISCONSIN, A CORPORATION OF WISCONSIN.

LIFTING JACK.    REISSUED

Application filed October 1, 1924. Serial No. 740,958.

This invention relates to the class of devices known as lifting jacks, and more particularly to such a device designed to have an exceptionally long lift in proportion to its size and height when in lowered or collapsed position.

While there are innumerable uses for such a jack, it is especially designed for use in the automotive industry with the new oversize or balloon tires. For this use, it is desirable to have a jack which is compact and of small vertical height when lowered, in order to be placed under the low axle or other frame parts when the tire is collapsed, and capable of a comparatively long lift to elevate the car above its normal driving height in order that the tire may be changed.

The jack is of that type employing a plurality of screws working one within the other and each contributing its share to the total lift of the jack. According to this invention the screws are telescoped or nested within one another and within the standard of the jack when in lowered position, and driving connections are provided whereby upon a continuous rotation of the driving means, which may be operated from a distance, the screws are successively and individually elevated, one at a time. According to the embodiment of the invention here shown by way of example, two nested screws are employed, the outer screw being an exteriorly threaded sleeve which meshes within a nut formed in the rotatable driving gear. The inner screw meshes within a nut formed in the upper end of the outer screw sleeve. The outer screw is held against rotation during its vertical travel, up or down, but is allowed to rotate in one direction only when at the upper end of its travel, and is allowed to rotate in the opposite direction only when at the lower end of its travel. During the upward non-rotary movement of the outer screw, the inner screw is carried up with it bodily. Before the outer screw has reached the upper limit of its travel, the load supporting cap at the upper end of the inner screw will have engaged the load. When the outer screw reaches the upper limit of its travel, it will become locked with the rotatable driving gear and turns therewith as a unit. A ratchet mechanism, in the upper end of the standard, permits the outer sleeve to rotate with the driving gear when at the upper limit of its travel, but prevents rotation of the screw sleeve in the opposite direction, for a reason hereinafter set forth. Since the inner screw is now in engagement with the load, and prevented from rotation by its contact therewith, the rotating nut in the inner end of the outer screw sleeve will now elevate the inner screw and continue the lifting of the load.

To lower the jack, the rotatable driving gear is turned in the opposite direction. The ratchet mechanism, hereinabove referred to, will almost immediately prevent rotation of the outer screw in the direction in which the driving gear is now being rotated, and the outer screw will be lowered through this driving gear, carrying the inner screw bodily with it. When the outer screw sleeve reaches the lower limit of its travel, it again becomes locked with the driving gear and is allowed to rotate therewith, a ratchet mechanism at the lower end of the standard permitting rotation of the sleeve in this direction only, which is the opposite direction to that permitted by the ratchet mechanism at the upper end of the standard. This rotation of the outer sleeve will lower the inner screw, which is still held against rotation by the load resting thereon, through the outer screw sleeve, until the load is disengaged.

The general object of the invention is to provide a jack operating as briefly noted above and as set forth in more detail hereinafter.

Another object is to provide novel means for permitting rotation of the outer screw sleeve in one direction, when at the upper limit of its travel, and in the opposite direction, when at the lower limit of its travel, while preventing rotation of this screw sleeve at all other times.

Another object is to provide a jack which will positively either raise or lower, as desired, the inner screw so long as it is in engagement with the load, even though the outer screw has reached the upper or lower limits of its travel.

A further object is to provide a compact and sightly jack, which is of light weight and economically produced, and in which the parts are easily assembled and readily accessible.

Other objects and advantages of the invention will be readily apparent from the following detailed description of certain approved forms of the apparatus.

In the accompanying drawings,

Fig. 1 is a central, vertical section through the jack, showing the outer screw at the upper limit of its travel, and the inner screw partially elevated.

Fig. 2 is an elevation of the jack, on a smaller scale, looking from the left at Fig. 1. In this view the jack is completely lowered.

Fig. 3 is a transverse section taken substantially on the line 3—3 of Fig. 1.

Fig. 4 is a transverse section taken substantially on the line 4—4 of Fig. 1.

Fig. 5 is a view similar to Fig. 3, through a modified form of the apparatus.

The stationary standard for the jack comprises a substantially cylindrical hollow casting 1, having a broad supporting base 2. Near its upper end the standard has an inner annular supporting ring or flange 3, and above this a housing 4 partially encloses the driving mechanism hereinafter described. One member 5 of the raceway for the ball bearing 6, rests upon the flange 3, while the other member 7 of the raceway supports the rotatable nut 8 which is formed integral with the hub of driving bevel gear 9. A short stub shaft 10, journaled in an extension 11 of the housing 4, carries at its inner end a driving beveled pinion 12 which meshes with the beveled driving gear 9. The outer end of shaft 10 is provided with a socket 13, to co-operate with any suitable form of removable handle, whereby the jack may be operated from a distance. It will be noted that the shaft 10 tilts upwardly so that the operator's end of the handle will be elevated to a convenient position.

Since the driving nut 8 supports the lifting screws, which in turn support the load, the entire load will always be transmitted to the standard 1 through the anti-friction bearing 6 and in this way the lifting or driving strain will be reduced to a minimum.

The outer screw 14 is in the form of a hollow sleeve exteriorly threaded to engage within the driving nut 8. Pins 15 and 16, inserted between successive turns of the thread of screw 14 at suitable points, engage the bottom and top faces, respectively, of nut 8 to establish the upper and lower limits of travel of the outer screw. Obviously, other equivalent means might be substituted for the pins 15 and 16 to engage the faces of nut 8 and limit the longitudinal travel in either direction of screw 14. An inner screw 17, threaded in the same direction as screw 14, engages within a nut 18 formed at the upper inner end of the screw sleeve 14.

A load supporting cap 19, preferably provided with an upper roughened load-engaging surface 20, is mounted upon the upper end of inner screw 17. A recess 21 in the cap loosely surrounds the upper end of the screw stem, and the cap rests rockingly upon the rounded upper end 22 of the stem, so that the cap may tilt to some extent to accommodate itself to the inclination of the load. A transverse pin 23 secures the cap to the screw stem.

The projecting ends of a pin 24, secured through the lower end of screw sleeve 14, travel up and down in the diametrically oppositely disposed grooves 25 formed in the body portion 1 of the standard. Just before the screw 14 reaches the upper limit of its travel, with the pin 15 against the lower face of nut 8, pin 24 runs out of the upper ends of grooves 25 into an annular space 26 in which the pin may rotate about the axis of screw 14. Similarly when the screw 14 has reached the lower limit of its travel, with the pin 16 against the upper face of nut 8, the pin 24 has passed out of the lower ends of the groves 25 into a space 27 in the lower end of the standard, which again permits the screw 14 and pin 24 to rotate.

A radially extending passage or chamber 28 extends from annular space 26 through one side of the standard. The mechanism for permitting rotation of pin 24 in one direction only is mounted in this chamber 28. A cover plate 29, secured to the face of the standard by screws 30 has a pair of parallel flanges 31 extending into chamber 28. Pivot pin 32 connects the flanges 31, and pawl 33 is pivotally mounted on pin 32. The toe 34 of this pawl normally projects slightly over one edge of one of the grooves 25, as shown in Fig. 3, and the heel 35 of the pawl is normally held against one side wall of chamber 28 by the spring 36, coiled about pin 32 and pressing at one end against one face of the pawl and at the other against the inner face of cover plate 29, all as shown in Fig. 3. When screw sleeve 14 and pin 24 are rotating in the direction of the arrow, Fig. 3, which is the direction of rotation when the lifting screws are being elevated, one end of pin 24, when it reaches the position shown in dotted lines, will engage the cam face 37 on pawl 33 and swing this pawl back against the pressure of spring 36 so that the pin 24 may continue its rotary travel past the pawl. However, when screw 14 is rotated in the opposite direction, which is the direction of rotation when the lifting screws are being lowered, the first end of pin 24 to engage the toe 34 of the pawl 33 will be prevented from further rotation by this pawl. The ends of the pin 24 will at this time be above the respective grooves 25 and the pin 24 will be moved downwardly through the screws by the action of rotating nut 8 upon the now non-rotary screw 14.

When screw sleeve 14 has reached the lower limit of its travel, pin 24 will have passed out of the lower ends of grooves 25, and will commence to rotate in the opposite direction in space 27, as indicated by the arrow in Fig. 4. In a radially extending passage or chamber 38, extending from space 27 through the side of the standard adjacent the base plate 2, is mounted a pawl assembly quite similar to that described in detail above and illustrated in Fig. 3, except that the pawl 39 is oppositely positioned and permits rotation of pin 24 in the opposite direction, all as illustrated in Fig. 4. A cover plate 40 closes the opening in the lower end of the jack standard after the various parts have been assembled therein.

Now describing the general operation of the jack, we will assume that the parts are in the collapsed position shown in Fig. 2, which represents the appearance of the jack when not in use. At this time both screws 14 and 17 are nested within the standard, and the pin 24 is within the annular space 27 at the lower end of the standard. The removable handle is now inserted in socket 13 and rotated in a clockwise direction. This will rotate gear 9 and nut 8 in a counter-clockwise direction, as seen from above, Fig. 1, and the screw sleeve 14 and pin 24 will tend to rotate in the same direction, but will be prevented from such rotation by the engagement of one end of pin 24 with the pawl 39. The screw sleeve 14 now being held from rotation by the engagement of pin 24 with pawl 39, will be moved upwardly by the rotating nut 8 and the ends of pin 24 will pass upwardly into the grooves 25, which will continue to hold the sleeve 14 against rotation. The inner screw 17 is still completely nested within outer screw 14 and will be moved up into engagement with the load and will lift the same, but there will be no rotation of either screw until outer screw 14 has reached the upper limit of its travel and has become locked with nut 8 by the engagement of pin 15 against the lower face of the nut. At this time pin 24 will have passed out of grooves 25 into space 26 and will be permitted to rotate in the direction of the arrow, Fig. 3, which is the direction in which the driving nut 8 is being rotated. The driving gear 9, nut 8 and outer sleeve 14 will now rotate as a unit, but since the inner screw 17 is now held against rotation by the engagement of the cap 19 with the load supported thereon, the rotation of nut 18 in the upper end of the screw sleeve 14 will now elevate the inner screw 17 which continues the lifting of the load. The rotation of the operating crank or handle is continued steadily in the same direction until the desired elevation of the load is obtained. In order to lower the load, the operating crank or handle is rotated in the opposite or counter-clockwise direction, which will rotate the driving gear 9 in a clockwise direction, as viewed from above in Fig. 1. This will tend to rotate screw sleeve 14 and pin 24 in a clockwise direction, as seen in Fig. 3, but the engagement of one end of pin 24 with the toe 34 of pawl 33 will prevent further rotation of the pin 24 and screw 14, and the screw 14 will be moved downwardly through the rotating nut 8, the pin 24 being guided down into the slots 25, which continue to prevent rotation of the screw sleeve. The inner screw 17, still in its extended position, will be carried bodily downward with the now non-rotary outer screw sleeve 14. When sleeve 14 has reached the lower limit of its travel, with pin 16 in engagement with the upper face of nut 8, it will commence to rotate with the nut, which rotation will be permitted by the pin 24, which has now passed out of the lower ends of grooves 25 into the space 27. The pawl 39 will permit rotation of the pin 24 and sleeve 14 in this clockwise direction, as shown in Fig. 4. Since the inner screw 17 is still held against rotation by the load resting thereon, it will now be moved downwardly through the rotating nut 18 and continue the lowering of the load. This movement will continue until the load has been completely released, at which time the jack may be removed from its position beneath the load. The inner screw may now be completely nested within the outer screw and the standard by manually holding this inner screw 17 against rotation while the clockwise rotation of shaft 10 is continued, or the inner screw may be spun down to its nested inoperative position by manually rotating the supporting cap 19.

It will be seen that the complete load lifting, or load lowering movement of the jack may be caused by a continuous rotation of the operating handle in the proper direction. There is no possibility of the outer screw becoming locked against lowering movement when at the upper end of its travel, or against upward movement when at the lower end of its travel, by failure of the pin 24 to properly enter the slots 25, since the engagement of the ends of the pin 24 with the pawl 33 or 39 will guide the pin directly into the slots 25.

The several elements of the jack are simple, light in weight, and the assembled jack is small and compact. In assembling the jack, the shaft 10 of driving pinion 12 is slipped into its bearing 11 through one of the open sides of the housing 4 and locked in place by the washer 41 and split ring 42. The driving gear and the roller bearing assembly are then placed in position through the open sides of housing 4, and the screws are placed in the standard through the open lower end thereof and the cover plate 40 is secured in place. The controlling pawls 33 and 39, already assembled upon their supporting plates, are slipped into place in the chambers 28 and 38 and held in position by securing the plates 29 to the standard by means of screws 30.

A slightly modified construction is indicated in Fig. 5. Instead of the guide slots 25, a pair of diametrically opposite vertical ribs 43 are used. The ends of pin 24 will engage against the sides of these ribs and the pin 24 and the sleeve 14 will be held against rotation in the same manner as when grooves 25 are used. The pawl 44 extends over the upper end of one of the ribs 43, as shown in Fig. 5, so as to permit continued rotation of pin 24 in the direction of the arrow, but prevent rotation thereof in the opposite direction and guide the pin down along the sides of the ribs. Spring 45 normally holds pawl 44 in the position shown, with its heel 46 again one side of the chamber 47 in the standard. Obviously, the same form of pawl assembly shown in Figs. 3 and 4 could be used with this rib construction shown in Fig. 5.

We claim:

1. A lifting jack comprising a standard, a rotatable interiorly threaded driving member mounted in the standard, an exteriorly threaded sleeve meshing within the driving member and having an interiorly threaded nut in its upper portion, a screw meshing within this nut, a projection extending laterally from the lower end of the sleeve, vertically extending guiding means in the standard preventing rotation of the projection during the vertical travel of the sleeve, the projection passing out of engagement with the guiding means when the sleeve reaches one limit of its vertical travel, and a pawl positioned adjacent this end of the guiding means cooperating with the projection to prevent rotation of the sleeve in one direction only.

2. A lifting jack comprising a standard, a rotatable interiorly threaded driving member mounted in the standard, an exteriorly threaded sleeve meshing within the driving member and having an interiorly threaded nut in its upper portion, a screw meshing within this nut, a projection extending laterally from the lower end of the sleeve, vertically extending guiding means in the standard preventing rotation of the projection during the vertical travel of the sleeve up or down, the projection passing out of engagement with the guiding means when the sleeve reaches its extreme upper or lower positions, and oppositely disposed pawls above and below the guiding means preventing rotation of the sleeve in one direction only when at the upper limit of its travel, and in the opposite direction only when at the lower limit of its travel.

3. In a lifting jack comprising a standard having a recess therein and a lifting screw mounted in the standard having a projection extending laterally therefrom, means cooperating with the projection to permit rotation of the screw in one direction only comprising a pawl-housing fitting within the recess, a pawl pivoted within the housing and projecting into the path of rotation of the projection, and a spring to normally hold the pawl within the path of the projection, but permitting the pawl to swing in one direction only to allow the projection to pass thereby.

4. A pawl assembly adapted for use within an open-ended recess in a lifting jack standard, comprising a cover plate having flanges adapted to extend within the recess, a pivot pin connecting the flanges, a pawl pivoted on the pin, and a spring encircling the pin and bearing at one end against one arm of the pawl and at its other end against the cover plate.

5. In a screw jack, the combination with a casing, an outer and an inner screw, and rotary means for raising or lowering the outer screw carrying with it the inner screw, of a projection on the outer screw near the end thereof, the casing having a circular groove for receiving said projection, a spring latch arranged in the groove in position to be depressed by said projection as it rotates in one direction but constituting a positive stop for the projection when rotating in the opposite direction, and a longitudinal guiding surface beyond the latch for guiding the projection to move longitudinally and preventing the outer screw from turning.

6. In a screw jack, the combination with a casing and a hollow internally threaded screw rotatable and movable therein, of an inner screw threaded into the outer screw and movable up and down therewith, rotary means for turning the outer screw to raise or lower both screws, the outer screw having a pin at the bottom thereof projecting radially, a spring latch at the top of the casing having a radial edge against which the pin is adapted to engage during its rotation in one direction to stop its rotation, a guide along the casing for the pin to guide the pin to descend without permitting the screw to turn, the casing being formed to allow the outer screw to turn in the opposite direction when at the elevation of said latch and to depress the latch and pass over it, whereby the inner screw will be raised when held from turning by the work and whereby when turned in the opposite direction the pin will engage the radial edge of the latch and be stopped and the screw will descend along said guide instead of turning.

7. In a screw jack, the combination with a casing having a vertical cylindrical passage with smooth walls provided with a pair of opposite longitudinal guides throughout its length, of an outer screw fitting in said cylindrical passage and having a pair of opposite radial projections adapted to engage said guides and located at the bottom of the screw, an inner screw threaded into the outer screw from the upper end and having a work rest fixed to its top, a nut engaging and surrounding the outer screw, means for supporting the nut in the casing which prevents the descent of the outer screw except as controlled by the nut, said casing having a circular groove at the top of said slots for receiving said projections and permitting the rotation of the outer screw when it is raised to its upper limit, whereby when the nut is turned to raise the outer screw, it will raise it to its upper limit and then rotate it so that the inner screw will continue to rise without rotating and the upward motion of the work rest will be continuous, and means positioned in the path of rotation of the projections on the outer screw, which engage the projections when the nut is turned in the opposite direction, after the outer screw is rotated less than a half revolution, whereby the projections on the outer screw will be stopped in registration with said guides and the further rotation of the nut in that direction will lower the outer screw without turning it and thereby lower the work rest.

8. A lifting jack comprising a standard, a rotatable interiorly threaded driving member mounted in the standard, an exteriorly threaded screw sleeve meshing within the driving member, the sleeve being also interiorly threaded, a second lifting screw meshing within the interior threads of the sleeve, and cooperating means on the standard and screw sleeve permitting vertical movement of the sleeve but preventing continued rotation thereof during this vertical movement, and permitting continuous rotation of the sleeve in one direction only when at the upper limit of its travel.

9. A lifting jack comprising a standard, a rotatable interiorly threaded driving member mounted in the standard, an exteriorly threaded screw sleeve meshing within the driving member, the sleeve being also interiorly threaded, a second lifting screw meshing within the interior threads of the sleeve, and cooperating means on the standard and screw sleeve permitting vertical movement of the sleeve but preventing continued rotation thereof in either direction during this vertical movement, and preventing continuous rotation of the sleeve in one direction only when at the upper limit of its travel and in the opposite direction only when at the lower limit of its travel.

10. A lifting jack comprising a standard, a rotatable interiorly threaded driving member mounted in the standard, an exteriorly threaded screw sleeve meshing within the driving member, the sleeve being interiorly threaded, a second lifting screw meshing within the interior threads of the sleeve, cooperating guiding means on the standard and screw sleeve permitting vertical movement of the sleeve but preventing continued rotation thereof during this vertical movement, and permitting continuous rotation of the sleeve in one direction when at the upper limit of its travel through the standard, and means preventing continued rotation of the sleeve in the opposite direction when the sleeve is at the upper limit of its travel and the driving member is rotated in a reverse direction to lower the jack.

11. A lifting jack comprising a standard, a rotatable interiorly threaded driving member mounted in the standard, an exteriorly threaded screw sleeve meshing within the driving member, the sleeve being interiorly threaded, a second lifting screw meshing within the interior threads of the sleeve, cooperating guiding means on the standard and screw sleeve permitting vertical movement of the sleeve but preventing continued rotation thereof during this vertical movement, and permitting continuous rotation of the sleeve in one direction when at the upper limit of its travel through the standard, and in the opposite direction when at the lower limit of its travel, and means in each end of the standard cooperating with the guiding means on the screw sleeve for preventing continued rotation of the sleeve in one direction when at the upper limit of its travel and in the other direction when at the lower limit of its travel.

12. A lifting jack comprising a standard, a rotatable interiorly threaded driving member mounted in the standard, an exteriorly threaded screw sleeve meshing within the driving member, the sleeve being also interiorly threaded, a second lifting screw meshing within the interior threads of the sleeve, and cooperating means on the standard and screw sleeve permitting vertical movement of the sleeve, but preventing continued rotation thereof during this vertical movement, a portion of the guiding means being yieldable to permit continued rotation of the screw sleeve in one direction only when at one limit of its vertical travel, while preventing continued rotation at this time in the opposite direction.

13. A lifting jack comprising a standard, a rotatable interiorly threaded driving member mounted in the standard, an exteriorly threaded screw sleeve meshing within the driving member, the sleeve being also interiorly threaded, a second lifting screw meshing within the interior threads of the sleeve, and cooperating means on the standard and screw sleeve permitting vertical movement of the sleeve but preventing continued rotation thereof during this vertical movement, portions of the guiding means being yieldable whereby continued rotation of the screw sleeve is prevented in one direction only when at the lower limit of its vertical travel, and in the other direction only when at the upper limit of its vertical travel.

14. In a lifting jack, a standard, a rotatable interiorly threaded driving member supported in the standard, a hollow screw sleeve threaded within the driving member, a lifting screw threaded within the sleeve, a projection carried by the sleeve, a vertically extending guide in the standard with which the projection engages to prevent rotation of the sleeve while moving vertically, the projection passing out of engagement with the guide when the sleeve is at one limit of its vertical travel, and stop means in the standard positioned adjacent the end of the guide for causing reengagement of the projection with the guide when the sleeve is rotated in one direction, the stop means being ineffective when the sleeve is rotated in the opposite direction.

15. In a lifting jack, a standard, a rotatable interiorly threaded driving member supported in the standard, a hollow screw sleeve threaded within the driving member, a lifting screw threaded within the sleeve, a projection carried by the sleeve, a vertically extending guide in the standard with which the projection engages to prevent rotation of the sleeve while moving vertically, the projection passing out of engagement with the guide when the sleeve is at either limit of its vertical travel, stop means in the standard adjacent the upper end of the guide for causing reengagement of the projection with the guide when the sleeve is rotated in one direction, and stop means in the standard adjacent the lower end of the guide for causing reengagement of the projection with the guide when the sleeve is rotated in the other direction, one stop means being ineffective in one direction of rotation of the sleeve and the other stop means being ineffective in the other direction of rotation of the sleeve.

16. In a lifting jack the combination of a standard, a driving nut rotatably supported on the standard, means for rotating the nut, an exteriorly threaded sleeve extending through and engaged by the nut and having an interior thread, a lifting screw externally threaded to engage the interior thread of the sleeve and guiding mechanism between the sleeve and standard for compelling the sleeve to move vertically in and out of the standard comprising devices which come into engagement with each other, when the sleeve is at one limit of its travel, for preventing the rotation of the sleeve in one direction only.

17. In a lifting jack the combination of a standard, a driving nut rotatably supported on the standard, means for rotating the nut, an exteriorly threaded sleeve extending through and engaged by the nut and having an interior thread, a lifting screw externally threaded to engage the interior thread of the sleeve, guiding mechanism between the sleeve and standard for compelling the sleeve to move vertically in and out of the standard comprising devices which come into engagement with each other, when the sleeve is at one limit of its travel, for preventing the rotation of the sleeve in one direction only and devices which come into engagement with each other when the sleeve is at the other limit of its travel for preventing rotation of the sleeve in the other direction only.

18. A lifting jack comprising a standard, a rotatable interiorly threaded driving member mounted in the standard, an exteriorly threaded screw sleeve meshing within the driving member, the sleeve being also interiorly threaded, a second lifting screw meshing within the threads in the sleeve, and cooperating means on the standard and screw sleeve for normally resisting rotary movement of the sleeve, but yielding to permit the sleeve to turn with the driving means when at the limits of its vertical movement.

19. A lifting jack comprising a standard, a rotatable exteriorly threaded driving member mounted in the standard, an exteriorly threaded screw sleeve meshing within the driving member, the sleeve being also interiorly threaded, a second lifting screw meshing within the threads in the sleeve, and cooperating means on the standard and screw sleeve for resisting rotary movement of the sleeve and thus causing the sleeve to move up at the lower limit of its travel and the driving means is rotated in one direction, the means yielding to permit rotation of the sleeve with the driving member when rotated in the opposite direction.

20. A lifting jack comprising a standard, a rotatable exteriorly threaded driving member mounted in the standard, an exteriorly threaded screw sleeve meshing within the driving member, the sleeve being also interiorly threaded, a second lifting screw meshing within the threads in the sleeve, and cooperating means on the standard and screw sleeve for resisting rotary movement of the sleeve and thus causing the sleeve to move down when at the upper limit of its travel and the driving means is rotated in one direction, the means yielding to permit rotation of the sleeve with the driving member when rotated in the opposite direction.

21. A lifting jack comprising a standard, a rotatable exteriorly threaded driving member mounted in the standard, an exteriorly threaded screw sleeve meshing within the driving member, the sleeve being also interiorly threaded, a second lifting screw meshing within the threads of the sleeve, and cooperating means on the standard and screw sleeve for resisting rotary movement of the sleeve and thus causing the sleeve to move vertically through the driving means when the driving means is rotated, the means being adapted to yield when the sleeve reaches either limit of its vertical travel to permit the sleeve to rotate with the driving member upon continued rotation of the driving member in the same direction that caused travel of the sleeve to this end of the standard.

WARREN H. WALKER.
JOSEPH J. MIZER.
IRWIN E. DEARSLEY.